(12) United States Patent
Nusier et al.

(10) Patent No.: US 9,764,704 B1
(45) Date of Patent: Sep. 19, 2017

(54) BUMPER

(71) Applicant: Ford Global Technologies, LLC, Dearborn, MI (US)

(72) Inventors: Saied Nusier, Canton, MI (US); Mohamed Ridha Baccouche, Ann Arbor, MI (US); James Chih Cheng, Troy, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/059,648

(22) Filed: Mar. 3, 2016

(51) Int. Cl.
 *B60R 19/02* (2006.01)
 *B60R 19/18* (2006.01)
 *B60R 19/34* (2006.01)

(52) U.S. Cl.
 CPC .............. *B60R 19/18* (2013.01); *B60R 19/34* (2013.01); *B60R 2019/1893* (2013.01)

(58) Field of Classification Search
 CPC .... B60R 2019/1806; B60R 2019/1813; B60R 2019/182; B60R 19/18
 USPC ........................ 293/133, 102; 280/163, 164.1
 See application file for complete search history.

(56) References Cited

U.S. PATENT DOCUMENTS

| | | | |
|---|---|---|---|
| 6,540,276 B2 * | 4/2003 | Azuchi | B60R 19/18 293/102 |
| 6,669,251 B2 | 12/2003 | Trappe | |
| 6,808,215 B2 * | 10/2004 | Sakuma | B60R 19/34 293/102 |
| 6,971,691 B1 | 12/2005 | Heatherington et al. | |
| 7,413,226 B2 | 8/2008 | Muskos | |
| 7,794,006 B2 | 9/2010 | Karlander | |
| 8,287,012 B2 * | 10/2012 | Kokubo | B21D 53/88 293/102 |
| 8,740,268 B2 | 6/2014 | Ebara et al. | |
| 8,746,761 B2 * | 6/2014 | Haneda | B60R 19/12 293/102 |
| 2001/0017473 A1 * | 8/2001 | Yamamoto | B60R 19/18 293/102 |
| 2002/0047281 A1 * | 4/2002 | Hartel | B60R 19/18 293/102 |
| 2006/0082170 A1 * | 4/2006 | Reierson | B60R 19/18 293/102 |
| 2007/0040398 A1 * | 2/2007 | Lutke-Bexten | B60R 19/18 293/102 |
| 2008/0093867 A1 * | 4/2008 | Glasgow | B60R 19/18 293/102 |

(Continued)

*Primary Examiner* — Dennis H Pedder
(74) *Attorney, Agent, or Firm* — Jason Rogers; Brooks Kushman P.C.

(57) ABSTRACT

A bumper assembly includes an elongated beam and a pair of crush cans. The elongated beam includes a plurality of reinforcing walls extending horizontally that define a gap in a central portion of the beam. The pair of crush can assemblies is attached to the beam at transversely spaced locations relative to the central portion of the beam. The central portion of the beam is structured to have less bending resistance than the right and left sides. The reinforcing walls span the crush can assemblies so that the gap facilitates bending the central portion of the beam. A method of making a bumper is also disclosed that includes the steps of selecting a bumper beam and partially removing an upper/central portion and a lower/central portion of the bumper beam.

13 Claims, 4 Drawing Sheets

(56) References Cited

U.S. PATENT DOCUMENTS

| | | | |
|---|---|---|---|
| 2010/0176607 A1* | 7/2010 | Hardy | B60R 9/06 293/102 |
| 2014/0152029 A1* | 6/2014 | Taniguchi | B60R 19/18 293/102 |
| 2015/0291114 A1* | 10/2015 | Borde | B60R 19/023 293/122 |

* cited by examiner

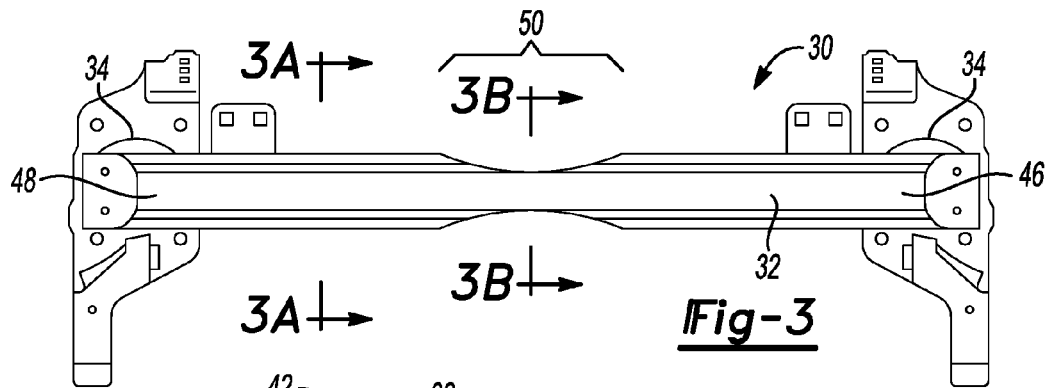
*Fig-3*
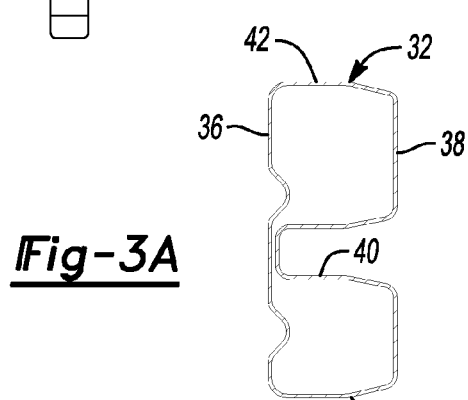
*Fig-3A*  *Fig-3B*
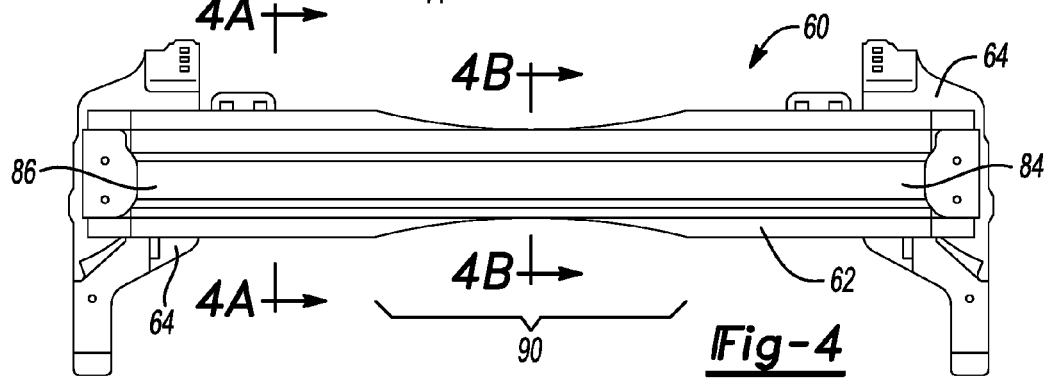
*Fig-4*
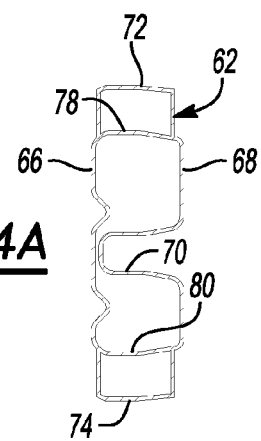 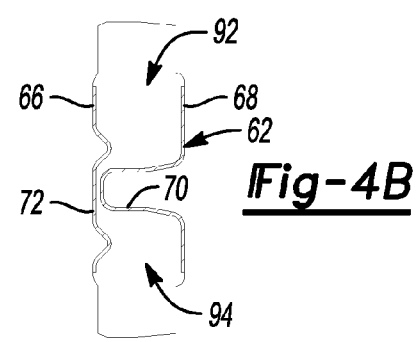
*Fig-4A*  *Fig-4B*

|  |  |  | Weighting | Note | Symbol |
|---|---|---|---|---|---|
| Homogenity / Geometry |  | 126 | 75% | 4.6 | – |
| Energy Input |  |  | 25% | 3.4 | ○ |
|  | Barrier Energy | 79% | 50% | 4.0 | ⊖ |
|  | Δv Barrier | 56.2 km/h | 50% | 2.8 | ○ |
|  | Bottom Out | 0 |  |  |  |
| Overall Rating |  |  |  | 4.3 | ⊖ |

|  | Weighting | Note | Symbol |
|---|---|---|---|
| Homogenity / Geometry | 75% | 4.6 | – |
| Energy Input | 25% | 3.4 | ○ |
| Overall Rating |  | 4.3 | ⊖ |

| Note |  |
|---|---|
| ++ → | Very Good |
| + → | Good |
| ○ → | Average |
| ⊖ → | Bare Min |
| -- → | Poor |

*Fig-5*

|  |  |  | Weighting | Note | Symbol |
|---|---|---|---|---|---|
| Homogenity / Geometry |  | 95 | 75% | 3.4 | ○ |
| Energy Input |  |  | 25% | 3.4 | ○ |
|  | Barrier Energy | 79% | 50% | 4.0 | ⊖ |
|  | Δv Barrier | 56.2 km/h | 50% | 2.8 | ○ |
|  | Bottom Out | 0 |  |  |  |
| Overall Rating |  |  |  | 3.4 | ○ |

|  | Weighting | Note | Symbol |
|---|---|---|---|
| Homogenity / Geometry | 75% | 3.4 | ○ |
| Energy Input | 25% | 3.4 | ○ |
| Overall Rating |  | 3.4 | ○ |

| Note |  |
|---|---|
| ++ → | Very Good |
| + → | Good |
| ○ → | Average |
| ⊖ → | Bare Min |
| -- → | Poor |

*Fig-6*

BUMPER

TECHNICAL FIELD

This disclosure relates to a vehicle bumper that is subjected to testing in a collision with a progressive deformable barrier and evaluated, in part, based upon the homogeneity of the deformation of the barrier.

BACKGROUND

Vehicles are subject to a wide variety of tests that are mandated by government regulations and insurance certifications. Tests for energy absorption, durability and passenger protection are conducted on new vehicles. Intrusions into the passenger compartment are analyzed in several tests related to occupant protection in a collision.

Due to the numerous types of collisions, new tests are constantly being proposed to improve occupant safety, pedestrian safety and the safety of other vehicle occupants. A new vehicle test for testing a vehicle is a test entitled "2020 Euro NCAP test" that tests for intrusions and also tests for compatibility of a vehicle design with other vehicles that may be involved in a collision. One measure of compatibility in the NCAP test relates to the homogeneity of the deformation of a moving barrier that collides with a moving vehicle. Deeper deformation areas on the movable barrier are undesirable and result in unsatisfactory test results.

When modifying elements a vehicle design to meet the requirements of one test, care must be taken to avoid adversely affecting other test results. For example, changes made to improve homogeneity test results cannot be made in such a way as to compromise passenger protection as measured in other tests.

The above problems and other problems are addressed by this disclosure as summarized below.

SUMMARY

According to one aspect of this disclosure, a bumper assembly is disclosed that includes an elongated beam and a pair of crush cans. The elongated beam includes a plurality of reinforcing walls extending horizontally that define a gap in a central portion of the beam. The pair of crush can assemblies is attached to the beam at transversely spaced locations relative to the central portion of the beam. The plurality of reinforcing walls span the crush can assemblies so that the gap facilitates bending the central portion of the beam.

According to another aspect of this disclosure, a bumper assembly is disclosed that comprises an elongated beam including a right side, a left side and a central portion between the right side and left side. The central portion of the beam is structured to have less bending resistance than the right and left sides. A pair of crush can assemblies is attached to the right side and the left side of the beam to predispose the beam to bend in the central portion in an offset collision.

The beam may include a front wall and a rear wall that includes a mid-level channel extending from the rear wall toward the front wall and that is disposed between the reinforcing walls. The reinforcing walls may include a top wall and a base wall and the mid-level channel may be disposed between the top wall and the base wall. The plurality of reinforcing walls may further comprise an upper/intermediate wall disposed between the top wall and the mid-level channel and a lower/intermediate wall disposed between the base wall and the mid-level channel.

The front wall and rear wall may have a reduced height at the central portion compared to a height of a right side portion and a left side portion. The beam may include a front wall and a rear wall with the rear wall including a mid-level channel extending from the rear wall toward the front wall. The mid-level channel is disposed between the plurality of reinforcing walls. The reinforcing walls may further comprise an upper/intermediate wall disposed above the mid-level channel and a lower/intermediate wall disposed below the mid-level channel.

According to another aspect of this disclosure, a method is disclosed for making a bumper including the steps of selecting a bumper beam and removing an upper/central portion and a lower/central portion of the bumper beam. The bumper beam includes a front wall and a rear wall that define a mid-level channel extending from the rear wall toward the front wall. The mid-level channel is disposed between a top wall and a base wall. The step of removing the upper/central portion also includes removing the top wall and removing the lower/central portion also includes removing the base wall to reduce the bending resistance of a central portion of the bumper beam.

According to other aspects of the method, an upper/intermediate wall may be disposed between the top wall and the mid-level channel, and a lower/intermediate wall may be disposed between the base wall and the mid-level channel, and the method may further comprise removing the upper/intermediate wall and the lower/intermediate wall. The method may further comprise removing the front wall and the rear wall above the mid-level channel in conjunction with removing the upper/central portion of the bumper and the upper/intermediate wall, and removing the front wall and the rear wall above the mid-level channel in conjunction with removing the lower/central portion of the bumper and the lower/intermediate wall. The step of removing the upper/central portion and the lower/central portion may be performed by cutting the bumper beam with a saw, a laser cutter or a trim press. The method may further comprise extruding the bumper beam.

The above aspects and other aspects of this disclosure will be described below with reference to the attached drawings.

BRIEF DESCRIPTION OF THE DRAWINGS

FIG. 3 is a front elevation view of a bumper assembly having a top wall and a base wall above and below the mid-level channel.

FIG. 3A is a cross-sectional view taken along the line 3A-3A in FIG. 3.

FIG. 3B is a cross-sectional view taken along the line 3B-3B in FIG. 3.

FIG. 4 is a front elevation view of a bumper assembly having a top wall and an upper/intermediate wall above a mid-level channel and a base wall and a lower/intermediate wall below the mid-level channel.

FIG. 4A is a cross-sectional view taken along the line 4A-4A in FIG. 4.

FIG. 4B is a cross-sectional view taken along the line 4B-4B in FIG. 4.

FIG. 5 is a chart showing the results of a 2020 Euro NCAP simulated test of a vehicle having a bumper beam similar to FIG. 3 without the central portions removed in terms of homogeneity of the deformation of the movable barrier.

FIG. 6 is a chart showing the results of a 2020 Euro NCAP simulated test of a vehicle having a bumper beam similar to FIG. 3 with the central portions removed in terms of homogeneity of the deformation of the movable barrier.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
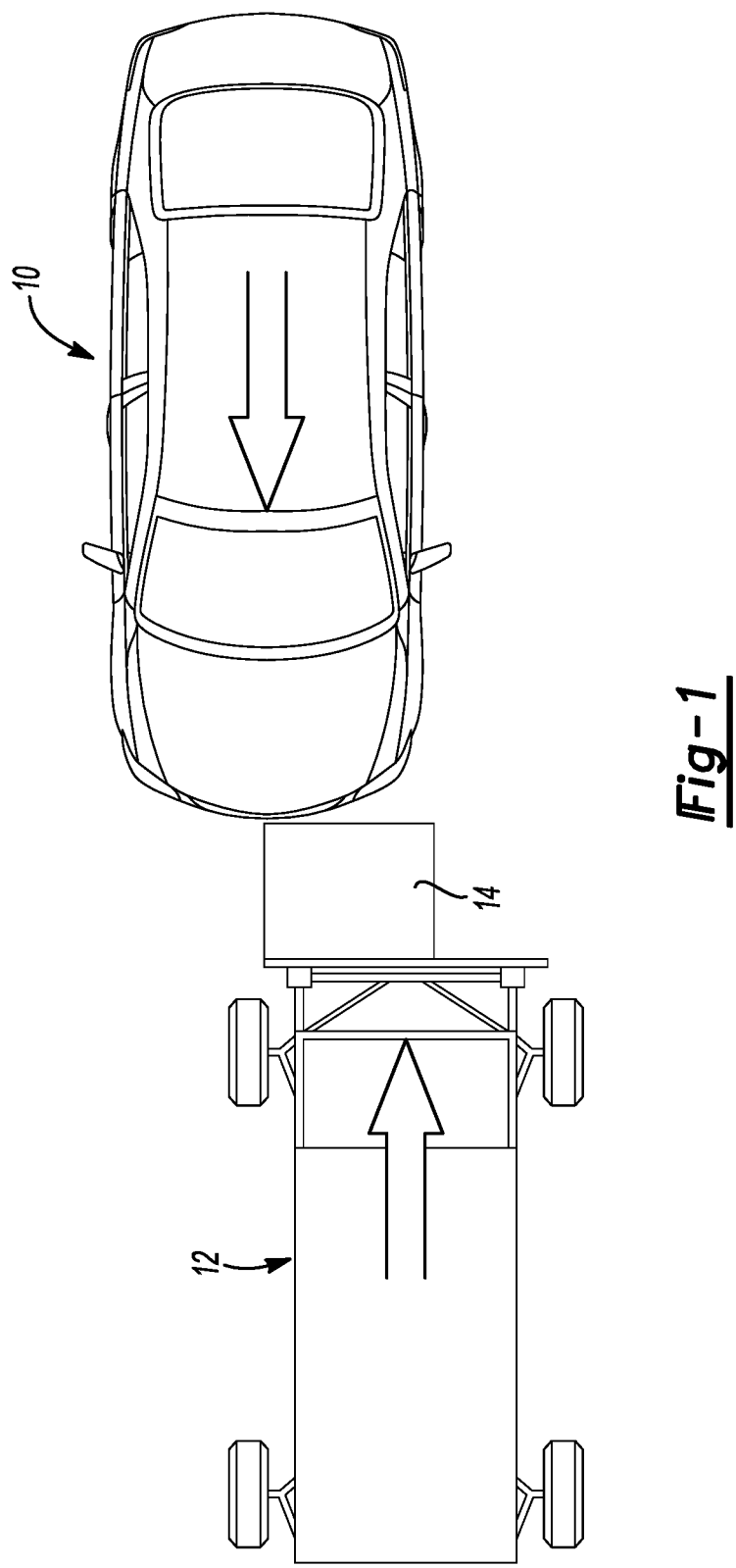
FIG. 1 is a diagrammatic top plan view of a vehicle and a movable deformable barrier just prior to an impact in a 2020 Euro NCAP Mobile Progressive Deformable Barrier Front Offset Impact Test.

Referring to FIG. 1, a vehicle 10 is shown with a movable barrier vehicle 12 just prior to a collision in a 2020 Euro NCAP Test. The movable barrier vehicle 12 supports and maneuvers a deformable barrier 14 comprising a tube-shaped assembly of hexagonal crush tubes 14.

Figure 2:
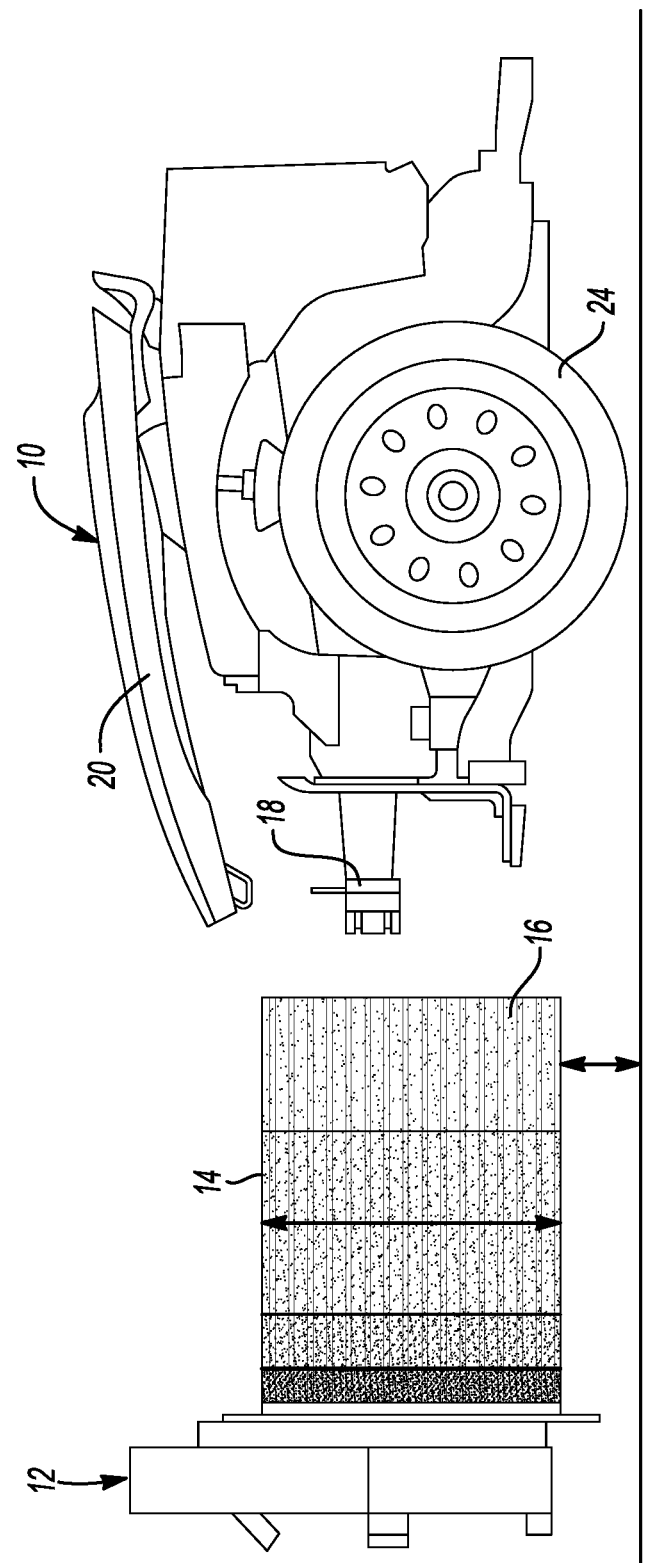
FIG. 2 is a diagrammatic side elevation view of the vehicle and the movable deformable barrier shown in FIG. 1 in the 2020 Euro NCAP Mobile Progressive Deformable Barrier Front Offset Impact Test.

Referring to FIG. 2, the vehicle 10 is shown with the movable barrier vehicle 12 and the deformable barrier 14 disposed just in front of a bumper assembly 18 of the vehicle 10. The bumper assembly 18 is shown below the hood 20 of the vehicle 10 and in front of the front wheel 24 of the vehicle 10. In the test, the vehicle 10 having a mass of 1800 Kg is moved at 50 Km/hr while the movable barrier vehicle 12 having a mass of 1400 Kg is moved at 50 Km/hr in an offset head-on collision. Following the collision, the deformable barrier 14 is scanned with a 3-D scanner that is used to measure the deformation of the deformable carrier 14 as a result of the off-set collision. The extent to which the deformable barrier 14 has consistent deformation across the face of the deformable barrier 14 it is considered to be homogenous while a non-uniform deformation of the deformable barrier 14 is considered to be non-homogenous. Based upon the 3-D scanning data, the value for homogeneity/geometry is assigned as the test result.

Referring to FIG. 3, a dual cell bumper assembly 30 is illustrated that includes an elongated beam 32 that is attached to a pair of crush can assemblies 34.

Referring to FIG. 3A, a section is taken through the elongated beam 32. In the area where the section is taken, the elongated beam 32 includes the front wall 36, rear wall 38 and a top wall 42 and base wall 44. The rear wall 38 defines a mid-level channel 40 that extends from the rear wall 38 toward the front wall 36. The elongated beam 32 includes a right side 46 (as viewed in FIG. 3) and a left side 48 on the opposite side of a central portion 50.

Referring to FIG. 3B, a cross-section is taken through the central portion 50 of the elongated beam 32. In this area, the top wall 42 and base wall 44 (shown in FIG. 3A) have been removed by cutting an upper portion of the beam 32 away to define an upper gap 54, or opening, and a lower portion of the beam away to form a lower gap 56, or opening. By cutting away the portions of the beam 32 (as shown in FIG. 3B), the bending resistance of the beam 32 is reduced. By reducing the bending resistance of the beam 32 in the central portion 50 of the beam 32, the results of the 2020 Euro NCAP simulated Test show an improvement in the homogeneity rating of the simulated test.

Referring to FIG. 4, a quad-cell bumper assembly 60 is shown to include an elongated beam 62 that is attached to a pair of crush can assemblies 64.

Referring to FIG. 4A, the elongated beam 62 includes a front wall 66 and a rear wall 68. The rear wall 68 defines a mid-level channel 70 that extends from the rear wall 68 towards the front wall 66. The elongated beam 62 also includes a top wall 72 and a base wall 74 that extend horizontally between the front wall 66 and the rear wall 68. The elongated beam 62 of the quad-cell bumper 60 also includes an upper/intermediate wall 78 and a lower/intermediate wall 80. The upper/intermediate wall 78 is disposed between the channel 70 and the top wall 72. The lower/intermediate wall 80 extends horizontally between the base wall 74 and the mid-level channel 70.

Referring to FIG. 4B, the beam 62 is illustrated as a cross-section taken through a central portion 90 (shown in FIG. 4) of the elongated beam 62. The top wall 72, base wall 74, upper/intermediate wall 78 and lower/intermediate wall 80 (shown in FIG. 4A) are shown cut away from the beam with a portion of the front wall 66 and rear wall 68 also being cut away from the beam 62. When the walls are cut away, an upper gap 92 is formed between the front wall 66 and rear wall 68 and a lower gap 94 is formed between the front wall 66 and the rear wall 68. By removing the four walls (72, 74, 78 and 80), the bending strength is reduced in the central portion 90 of the elongated beam 62.

Referring to FIG. 5, a chart rating the homogeneity/geometry of the barrier after a collision is presented and reflects that the beam without a reduced height central portion 50, was rated at 126. The homogeneity/geometry rating is weighted at 75% and was determined to be poor. But in the simulated test, value is also assigned for the energy input to the movable barrier that was rated at 3.4 and was given a 25% weight. The energy input is a product of the barrier energy rating of 79% and the Delta velocity of the barrier of 56.2 Km/hr. The barrier energy value and Delta V barrier values were each weighted 50% and resulted in a bare minimum acceptability rating for the barrier energy and an average acceptability rating for the Delta V barrier value. The overall rating for the simulated bumper beam was evaluated as being a bare minimum acceptability result.

Referring to FIG. 6, a chart of the homogeneity test for a bumper made according to FIG. 3 resulted in a homogeneity/geometry result of 95. The barrier energy and Delta V barrier values were held the same as in the test reported in FIG. 5, but the lower homogeneity/geometry result of 95 improved to an average acceptability rating. When the homogeneity/geometry rating was combined with the energy input value and weighted as described above, the overall rating of the bumper with the reduced height and cut-away wall in the central portion improved to an average acceptability rating and represents a substantial improvement over the test result reported in FIG. 5.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A bumper assembly comprising:
    an elongated beam including a top wall, a front wall and a rear wall extending horizontally, a mid-level channel extends from the rear wall towards the front wall, and wherein a central portion of the top wall, a central portion of the front wall and a central portion of the rear wall define an opening in a central portion of the beam that is bounded by the front and rear walls and the mid-level channel, wherein the opening is upwardly open; and
    a pair of crush can assemblies attached to the beam at transversely spaced locations from the central portion of the beam, wherein the plurality of reinforcing walls span the crush can assemblies, and the opening facilitates bending the central portion of the beam.

2. The bumper assembly of claim 1 wherein the beam further includes a base wall, wherein a central portion of the base wall, a lower central portion of the front wall and a lower central portion of the rear wall define a lower opening in a central portion of the beam that is bounded by the front and rear walls and a mid-level channel, wherein the opening is downwardly open, and wherein the mid-level channel is disposed between the top wall and the base wall.

3. The bumper assembly of claim 2 wherein the plurality of reinforcing walls further comprise:
    an upper/intermediate wall disposed between the top wall and the mid-level channel; and
    a lower/intermediate wall disposed between the base wall and the mid-level channel.

4. The bumper assembly of claim 2 wherein the front wall and rear wall have a reduced height at the central portion compared to a height of a right side portion and a left side portion.

5. The bumper assembly of claim 1 wherein the beam includes a front wall and a rear wall, and wherein the rear wall includes a mid-level channel extending toward the front wall, the mid-level channel being disposed between the plurality of reinforcing walls, wherein the plurality of reinforcing walls further comprise:
    an upper/intermediate wall disposed above the mid-level channel; and
    a lower/intermediate wall disposed below the mid-level channel.

6. A bumper assembly comprising:
    an elongated beam including a right side, a left side and a central portion between the right side and left side, a front wall and a rear wall have a reduced height at the central portion compared to a height of the front wall and the rear wall in the right side portion and left side portion, wherein a first horizontal wall is provided on the right side portion and a second horizontal wall is provided on the left side portion, and wherein the right side portion and the left side portions define an opening in the central portion that is bounded by the front and rear walls and a mid-level channel, wherein the opening is upwardly open; and
    a pair of crush can assemblies attached to the right side and the left side, wherein the beam is predisposed to bend in the central portion in an offset collision.

7. The bumper assembly of claim 6 wherein the rear wall includes the mid-level channel extending toward the front wall, the mid-level channel being disposed between a plurality of reinforcing walls, wherein the plurality of reinforcing walls include a top wall and a base wall, wherein the mid-level channel is disposed between the top wall and the base wall.

8. The bumper assembly of claim 7 wherein the plurality of reinforcing walls further comprise:
    an upper/intermediate wall disposed between the top wall and the mid-level channel; and
    a lower/intermediate wall disposed between the base wall and the mid-level channel.

9. The bumper assembly of claim 7 wherein the front wall and the rear wall have a reduced height at the central portion compared to a height of the front wall and the rear wall in the right side portion and left side portion.

10. A method comprising:
    selecting a bumper beam including a front wall and a rear wall that define a mid-level channel extending toward the front wall, the bumper beam having upper/intermediate and lower/intermediate walls disposed between the mid-level channel a top wall and a base wall, respectively; and
    removing an upper/central portion of the bumper beam including the top wall and a lower/central portion of the base wall and the upper/intermediate and lower/intermediate walls.

11. The method of claim 10 further comprising:
    removing a portion of the front wall and a portion of the rear wall above the mid-level channel in conjunction with removing the upper/central portion of the bumper and the upper/intermediate wall; and
    removing a portion of the front wall and a portion of the rear wall below the mid-level channel in conjunction with removing the lower/central portion of the bumper and the lower/intermediate wall.

12. The method of claim 10, wherein the step of removing the upper/central portion and the lower/central portion is performed by cutting the bumper beam.

13. The method of claim 10 further comprising:
    extruding the bumper beam.

* * * * *